US 10,267,179 B2

United States Patent
Manning et al.

(10) Patent No.: US 10,267,179 B2
(45) Date of Patent: Apr. 23, 2019

(54) DIRT EXTRACTION APPARATUS FOR A GAS TURBINE ENGINE

(71) Applicant: General Electric Company, Schenectady, NY (US)

(72) Inventors: Robert Francis Manning, Lynn, MA (US); Victor Hugo Silva Correia, Lynn, MA (US); David Vickery Parker, Lynn, MA (US)

(73) Assignee: General Electric Company, Schenectady, NY (US)

( * ) Notice: Subject to any disclaimer, the term of this patent is extended or adjusted under 35 U.S.C. 154(b) by 263 days.

(21) Appl. No.: 14/954,240

(22) Filed: Nov. 30, 2015

(65) Prior Publication Data

US 2016/0186601 A1  Jun. 30, 2016

Related U.S. Application Data

(60) Provisional application No. 62/098,912, filed on Dec. 31, 2014.

(51) Int. Cl.
*F01D 25/00* (2006.01)
*F04D 17/10* (2006.01)
(Continued)

(52) U.S. Cl.
CPC ......... *F01D 25/002* (2013.01); *F01D 25/005* (2013.01); *F04D 17/10* (2013.01);
(Continued)

(58) Field of Classification Search
None
See application file for complete search history.

(56) References Cited

U.S. PATENT DOCUMENTS 3,067,937 A     12/1962  Hinkein et al.
3,796,511 A *   3/1974   Hansen ................. F04D 29/701
                                              415/144
(Continued)

FOREIGN PATENT DOCUMENTS

CN      202991668 U     6/2013
EP       3015681 A1     5/2016
(Continued)

OTHER PUBLICATIONS

Notification of Reasons for Refusal issued in connection with corresponding JP Application No. 2015-245793 dated Feb. 7, 2017.
(Continued)

*Primary Examiner* — Jason D Shanske
*Assistant Examiner* — Theodore C Ribadeneyra
(74) *Attorney, Agent, or Firm* — General Electric Company; Pamela A. Kachur

(57) ABSTRACT

A centrifugal compressor apparatus includes: an impeller mounted for rotation about a central longitudinal axis, the impeller including an impeller disk carrying an array of impeller blades around its periphery; a diffuser disposed downstream of the impeller, configured to diffuse and turn airflow discharged from the impeller; an extraction scoop disposed in fluid communication with the impeller and with a plenum disposed adjacent the impeller, and a dirt collector disposed in fluid communication with the plenum and configured to trap dirt therein.

17 Claims, 5 Drawing Sheets

(51) Int. Cl.
*F01D 25/32* (2006.01)
*F02C 7/232* (2006.01)

(52) U.S. Cl.
CPC .............. *F01D 25/32* (2013.01); *F02C 7/232* (2013.01); *F05D 2220/32* (2013.01); *F05D 2260/602* (2013.01); *F05D 2260/607* (2013.01)

(56) References Cited

U.S. PATENT DOCUMENTS

| | | | |
|---|---|---|---|
| 3,905,197 | A | 9/1975 | Miller |
| 5,039,317 | A | 8/1991 | Thompson et al. |
| 6,673,133 | B2 | 1/2004 | Sechrist et al. |
| 6,797,026 | B2 | 9/2004 | Sechrist et al. |
| 7,922,784 | B2 | 4/2011 | Saeed et al. |
| 8,092,145 | B2 | 1/2012 | Martel et al. |
| 2007/0119145 | A1* | 5/2007 | O'Neill ................ B01D 45/08 60/39.092 |
| 2007/0144139 | A1* | 6/2007 | Kawamoto ............ F02C 7/05 60/39.092 |
| 2010/0005799 | A1* | 1/2010 | Nikpour ............. F04D 27/0207 60/605.1 |
| 2010/0104422 | A1* | 4/2010 | Martel ..................... F02C 6/08 415/121.2 |
| 2014/0112762 | A1* | 4/2014 | Isogai .................. F04D 29/441 415/121.3 |
| 2014/0190347 | A1* | 7/2014 | Wong ................... F01D 25/002 95/65 |
| 2016/0123154 | A1* | 5/2016 | Manning ................ F01D 5/147 416/90 R |
| 2016/0134994 | A1 | 5/2016 | Kellner et al. |

FOREIGN PATENT DOCUMENTS

| | | |
|---|---|---|
| JP | H1-105729 U | 7/1989 |
| JP | 03260336 A | 11/1991 |
| JP | 2002-517657 A | 6/2002 |
| JP | 2002242699 A | 8/2002 |
| JP | 2010-525224 A | 7/2010 |
| JP | 2010-216456 A | 9/2010 |
| JP | 2011-41944 A | 9/2012 |
| JP | 2013-531159 A | 8/2013 |
| JP | 2014-234729 A | 12/2014 |

OTHER PUBLICATIONS

European Search Report and Written Opinion issued in connection with corresponding EP Application No. 15200444.6 dated May 18, 2016.

Machine translation and First Office Action and Search issued in connection with corresponding CN Application No. 201511014244.6 dated Aug. 21, 2017.

* cited by examiner

DIRT EXTRACTION APPARATUS FOR A GAS TURBINE ENGINE

CROSS REFERENCE

This non-provisional application claims the benefit of priority under 35 U.S.C. § 119(e) to U.S. Provisional Patent Application No. 62/098,912, entitled "DIRT EXTRACTION APPARATUS FOR A GAS TURBINE ENGINE" filed Dec. 31, 2014, which is herein incorporated in its entirety by reference.

BACKGROUND OF THE INVENTION

This invention relates generally to turbomachinery compressors and more particularly relates to dirt extraction in such compressors.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work.

It is a recognized problem that the presence of dirt in the gas path and turbine cooling air flow of a gas turbine engine results in reduced durability and increased performance deterioration. Also, thermal barrier coatings ("TBC") found in gas turbine engines are susceptible to attack by calcium-magnesium alumino-silicate ("CMAS") melts produced when silica-based debris is ingested.

Deflectors have been used in the turbine systems of such engines, with limited success. Inlet particle separators have also been used and are effective on larger particles, but relatively ineffective for smaller sizes that tend to cause the majority of turbine issues.

Accordingly, there remains a need for a means for removing dirt from the flowpath of a gas turbine engine.

BRIEF DESCRIPTION OF THE INVENTION

This need is addressed by the present invention, which provides a centrifugal compressor stage having an extraction scoop for removing particulates from a primary flowpath, and a structure for trapping the extracted particulates.

According to one aspect of the invention, a centrifugal compressor apparatus includes: an impeller mounted for rotation about a central longitudinal axis, the impeller including an impeller disk carrying an array of impeller blades around its periphery; a diffuser disposed downstream of the impeller, configured to diffuse and turn airflow discharged from the impeller; an extraction scoop disposed in fluid communication with the impeller and with a plenum disposed adjacent the impeller, and a dirt collector disposed in fluid communication with the plenum and configured to trap dirt therein.

BRIEF DESCRIPTION OF THE DRAWINGS

The invention may be best understood by reference to the following description taken in conjunction with the accompanying drawing figures in which.

DETAILED DESCRIPTION OF THE INVENTION

The present invention generally provides a centrifugal compressor stage having a dirt extraction apparatus for removing entrained particulate matter (generally referred to herein as "dirt" regardless of its specific composition) from a primary flowpath, along with means for collecting the extracted dirt. Several examples of specific implementations are described in detail below.

Figure 1:
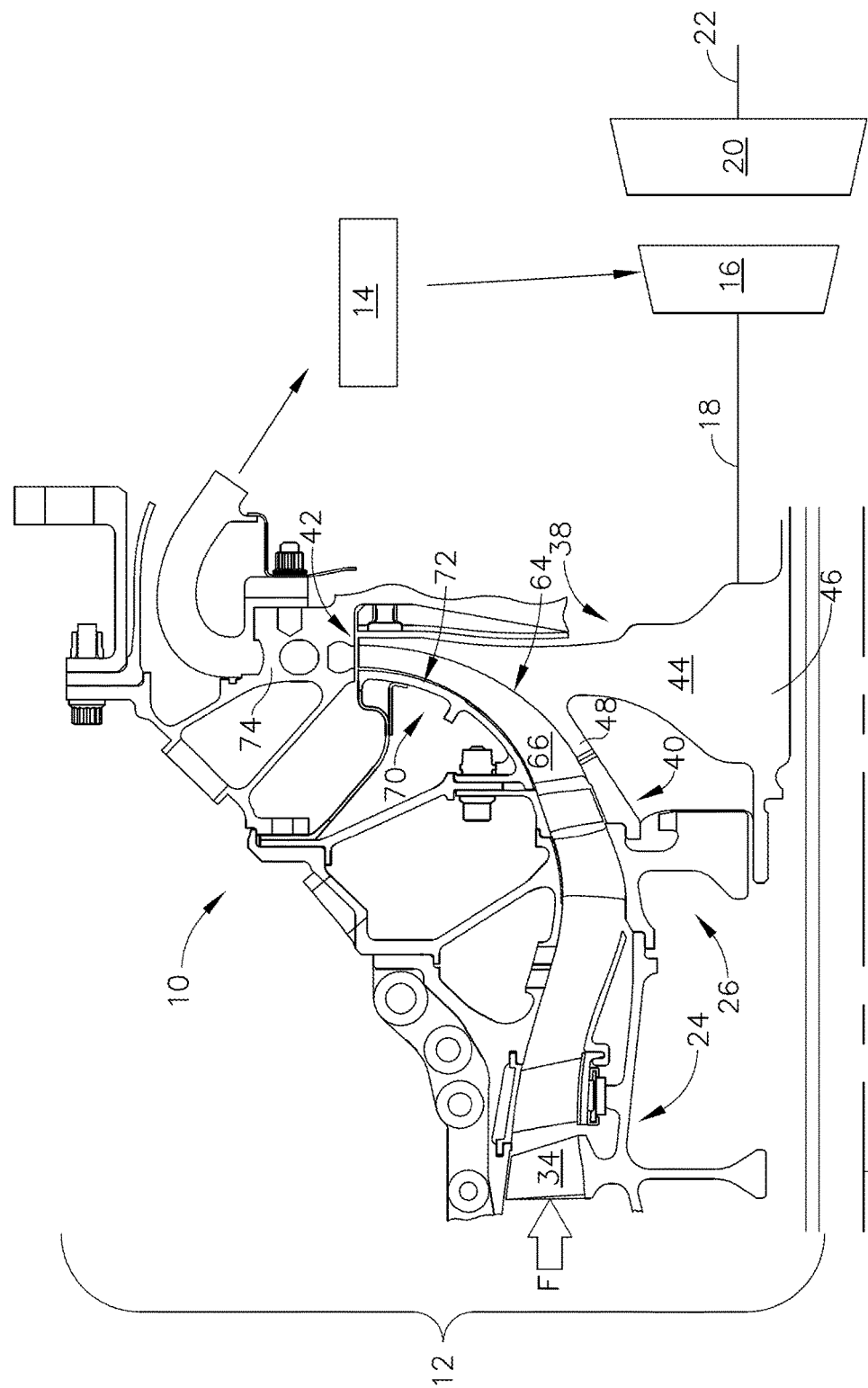
FIG. 1 is a cross-sectional, schematic view of a gas turbine engine that incorporates a compressor rotor apparatus constructed in accordance with an aspect of the present invention.

Now, referring to the drawings wherein identical reference numerals denote the same elements throughout the various views, FIG. 1 depicts an exemplary compressor 10 constructed in accordance with an aspect of the present invention. In the illustrated example, the compressor 10 is incorporated into a gas turbine engine 12 with a central longitudinal axis "A" and including in sequential flow sequence, the compressor 10, a combustor 14, and a gas generator turbine 16 (the combustor 14 and gas generator turbine 16 are shown schematically). As used herein, the terms "axial" and "longitudinal" both refer to a direction parallel to the axis A, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The compressor 10 provides compressed air that passes primarily into the combustor 14 to support combustion and partially around the combustor 14 where it is used to cool both the combustor liners and turbomachinery further downstream. Fuel is introduced into the forward end of the combustor 14 and is mixed with the air in a conventional fashion. The resulting fuel-air mixture flows into the combustor 14 where it is ignited to generate hot combustion gases. The hot combustion gases are discharged to the gas generator turbine 16 where they are expanded so that energy is extracted. The gas generator turbine 16 drives the compressor 10 through a shaft 18. In the illustrated example, the engine 12 is a turboshaft engine and a work turbine (also called a power turbine) 20 is located downstream of the gas generator turbine 16 and coupled to an output shaft 22 which can be connected to a mechanical load. However, the principles described herein are equally applicable to any centrifugal compressor stage. For example, they may apply to a compressor driven by an external prime mover.

The compressor 10 includes an axial portion 24 and a centrifugal portion 26. The axial portion 24 of the compressor 10 is configured for axial fluid flow. It includes a number of stages, each of which includes a row of rotating airfoils or blades 34.

The centrifugal portion 26 of the compressor 10 is configured for centrifugal or mixed axial-centrifugal fluid flow. It includes an impeller 38 mounted for rotation with the shaft 18, and having axially forward and aft ends 40 and 42. The impeller 38 includes an annular impeller disk 44, with a hub 46 disposed at its radially inner end. An annular impeller arm 48 extends axially forward from the impeller disk 44 to couple it to the axial portion 24.

Collectively, the impeller arm 48 and the impeller disk 44 define a generally concave-curved inner flowpath surface 64. The inner flowpath surface 64 extends in a generally longitudinal direction towards the forward end 40 and extends in a generally radial direction near the aft end 42. An annular array of airfoil-shaped impeller blades 66 extend radially outward from the inner flowpath surface 64. The impeller blades 66 are configured in terms of their dimensions, cross-sectional shape, orientation, spacing, and other parameters (in accordance with conventional practice) to provide an incremental velocity increase to the air flowing past them as the impeller 38 rotates.

An annular shroud assembly 70 surrounds the impeller 38. The shroud assembly 70 defines a generally convex-curved outer flowpath surface 72 that closely surrounds the tips of the impeller blades 66. Together the inner and outer flowpath surfaces 64 and 72 define a primary flowpath through the centrifugal portion 26. A diffuser 74 collects the air discharged from the impeller 38 and redirects it towards the combustor 14.

Figure 2:
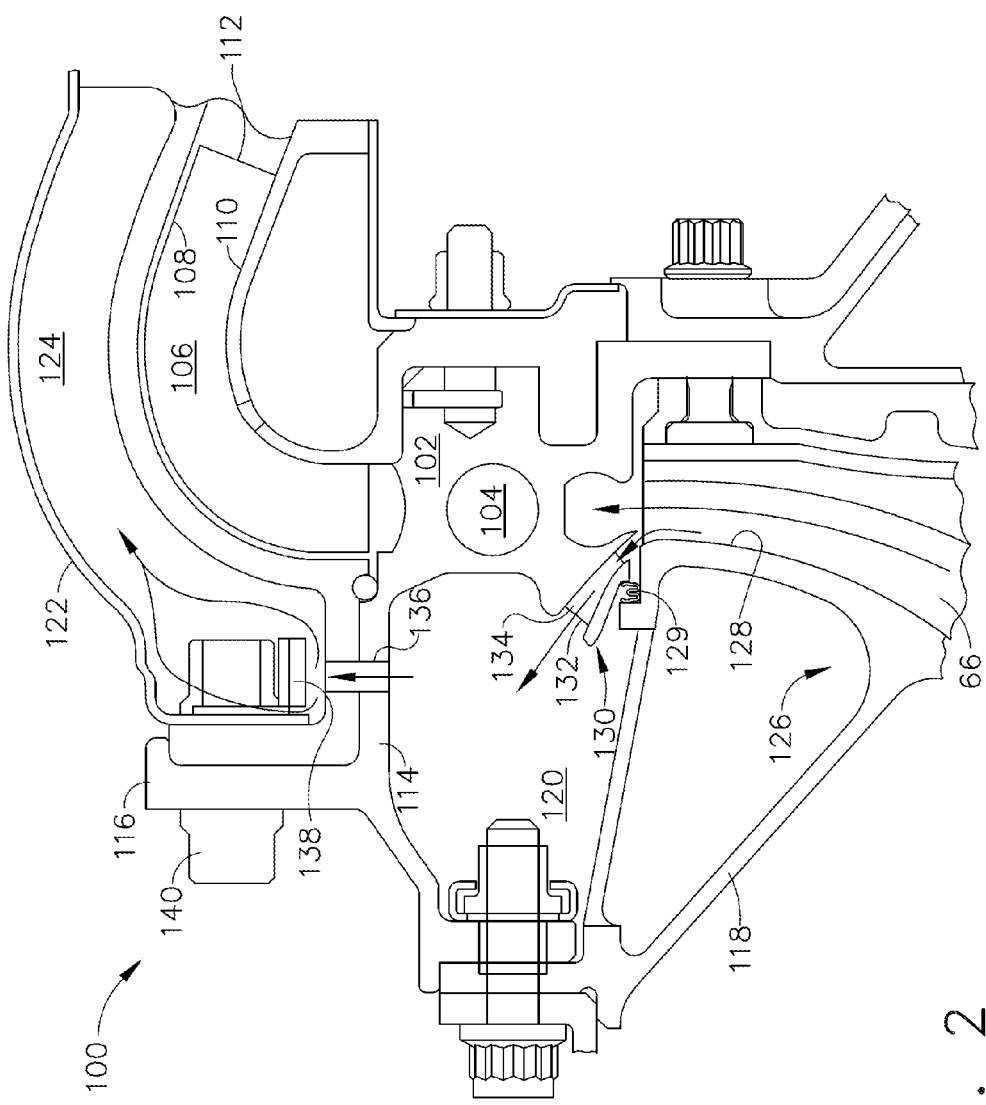
FIG. 2 is a schematic, sectional view of a portion of the engine of FIG. 1, incorporating a dirt extraction apparatus according to an exemplary embodiment of the invention.

FIG. 2 depicts an exemplary configuration of a dirt extraction apparatus 100 which may be incorporated into the compressor 10 described above. Generally, the dirt extraction apparatus 100 involves modifications of the shroud assembly 70, the diffuser 74, and surrounding components.

A stationary diffuser housing 102 is positioned radially adjacent the exit openings of impeller blades 66 to receive the airflow as it leaves the impeller 38. The diffuser housing 102 includes a plurality of diffuser passageways 104, each of which extends as a tangent to an imaginary circle that has its center coincident with the longitudinal axis A. Each of the diffuser passageways 104 is in partially overlapped relationship with adjacent diffuser passageways.

Positioned radially outwardly of diffuser housing 102 is an outlet flow passageway 106 of annular, axisymmetric form that is defined by a curved outer wall 108 and a corresponding curved inner wall 110 that is spaced radially inwardly of outer wall 108. The outlet flow passageway 106 serves to turn the airflow leaving the diffuser passageways 104 so that the radial velocity component of the airflow is turned through an angle greater than 90 degrees, to flow in a generally axial direction relative to the longitudinal axis A.

The outlet flow passageway 106 also includes a plurality of generally radially extending and circumferentially spaced turning vanes 112 that are provided to turn the flow that exits from diffuser passageways 104 into a substantially axial direction from the generally tangential direction of the flow as it leaves the respective diffuser passageways 104 and flows through the outlet passageway 106.

An annular outboard plenum wall 114 extends axially forward from the diffuser housing 102, and includes a flange 116 extending radially outward. Forward of the flange 116, the outboard plenum wall 114 extends radially inward and axially forward to join an annular inboard plenum wall 118. An annular plenum 120 is defined between the inboard and outboard plenum walls 114, 118.

An annular, curved bypass wall 122 extends aft from the flange 116 and runs generally parallel to the outer wall 108 of the outlet passageway 106, defining a bypass duct 124 in cooperation with the outer wall 108.

An annular shroud assembly 126 surrounds the impeller 38. The shroud assembly 126 defines a generally convex-curved outer flowpath surface 128 that closely surrounds the tips of the impeller blades 66. An outboard end of the shroud assembly 126 incorporates an annular seal 129 (for example a W-seal) to reduce air leakage between the shroud assembly 126 and the diffuser housing 102.

An extraction scoop 130 is disposed just outboard and axially forward of the impeller blades 66. In the illustrated example the extraction scoop 130 comprises an annular slot or passage 132 aligned at an acute angle to the longitudinal axis A. The passage 132 may be formed as an integral part of the diffuser housing 102. The passage 132 may increase in flow area in the direction of flow (i.e. it may have a diffuser shape) and may include an annular array of vanes 134 which are configured to increase in area and turn flow from a tangential direction to an axial direction, serving both diffusing and deswirling functions. The extraction scoop 130 communicates with the plenum 120. The outboard plenum wall 114 includes a plurality of radially-aligned impingement holes 136 therein, communicating with the plenum 120 and the bypass duct 124.

A dirt collector 138 is disposed in the bypass duct 124. In the illustrated example the dirt collector 138 is a ring of porous, sponge-like metallic material and is mounted to the flange 116 with bolts 140. The dirt collector 138 may be any structure or material (e.g. metal, ceramic) which is effective to retain dirt or other particulate entrained in an air stream that passes through or over its surface, and may be porous or non-porous.

In operation, the extraction scoop 130 takes advantage of the high swirl of the air exiting the impeller 38, which forces small dirt particles in the flowpath to the outer flowpath surface 128. The extraction scoop 130 is sized to pass a small portion of the impeller flow, referred to herein as a "diverted flow", into the plenum 120. The diverted flow may represent approximately 0.3-10.0% of the total mass air flow and has a higher concentration of dirt than the remainder of the impeller flow because of the effect of swirl which tends to centrifuge the dirt outboard, as noted above. As a result, the main flow exiting the diffuser can have a significant reduction in dirt compared to the air entering the impeller 38, for example approximately a 60-90% reduction is possible. The extraction scoop 130 is aerodynamically configured to recover a significant fraction (for example, up to 50%) of the total dynamic head of the diverted flow. The dirt collector 138 retains the dirt and can be later removed and replaced or cleaned at overhaul. The bypass duct 124 provides an exit for the diverted flow, should the dirt collector 138 become blocked. The bypass duct 124 may be routed to the existing secondary flowpath of the engine 12.

Figure 3:
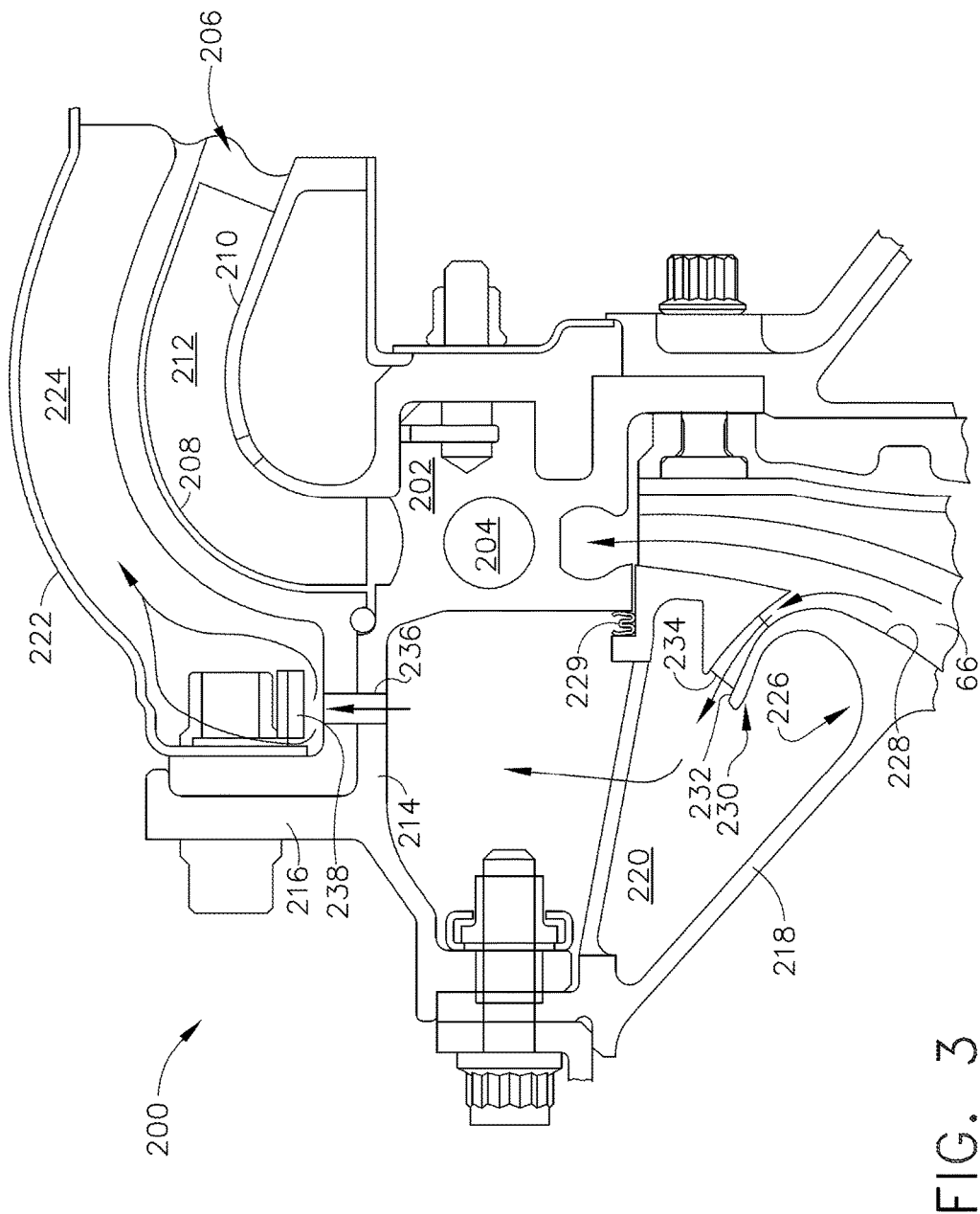
FIG. 3 is a schematic, sectional view of a portion of the engine of FIG. 1, incorporating a dirt extraction apparatus according to an alternative exemplary embodiment of the invention.

FIG. 3 depicts an alternative configuration of a dirt extraction apparatus 200 which may be incorporated into the compressor 10 described above. The dirt extraction apparatus 200 is generally similar to the dirt extraction apparatus 100 described above. Structures not specifically described may be considered to be identical to corresponding structures of the dirt extraction apparatus 100.

A stationary diffuser housing 202 is positioned radially adjacent the exit openings of impeller blades 66 and includes a plurality of diffuser passageways 204. Downstream of the diffuser passageways 204, an outlet flow passageway 206 with curved inner and outer walls 210, 208 has a plurality of turning vanes 212 therein.

An annular outboard plenum wall 214 extends axially forward from the diffuser housing 202, and includes a flange 216 extending radially outward. Forward of the flange 216, the outboard plenum wall 214 extends radially inward and axially forward to join an annular inboard plenum wall 218. An annular plenum 220 is defined between the inboard and outboard plenum walls 214, 218.

An annular, curved bypass wall 222 extends aft from the flange 216 and runs generally parallel to the outer wall 208 of the outlet passageway 206, defining a bypass duct 224 in cooperation with the outer wall 208.

An annular shroud assembly 226 surrounds the impeller 38. The shroud assembly 226 defines a generally convex-curved outer flowpath surface 228 that closely surrounds the tips of the impeller blades 66. An outboard end of the shroud assembly 226 incorporates an annular seal 229 (for example a W-seal) to reduce air leakage between the shroud assembly 226 and the diffuser housing 202.

An extraction scoop 230 is disposed just outboard and axially forward of the impeller blades 66. In the illustrated example the extraction scoop 230 comprises an annular slot or passage 232 aligned at an acute angle to the longitudinal axis A. The passage 232 may be formed as an integral part of the shroud assembly 226. The passage 232 increases in flow area in the direction of flow (i.e. it may have a diffuser shape) and may include an annular array of vanes 234 which are configured to increase in area and turn flow from a tangential direction to an axial direction, serving both diffusing and deswirling functions. The extraction scoop 230 communicates with the plenum 220. The outboard plenum wall 214 includes a plurality of radially-aligned impingement holes 236 therein, communicating with the plenum 220 and the bypass duct 224.

A dirt collector 238, of the type described above, is disposed in the bypass duct 224. The operation of the dirt collection apparatus 200 is substantially the same as described above, the significant difference being that the dynamic head and temperature of the diverted flow would be lower than for the apparatus 100, due to the flow being diverted from the impeller 38 at a relatively upstream location.

Figure 4:
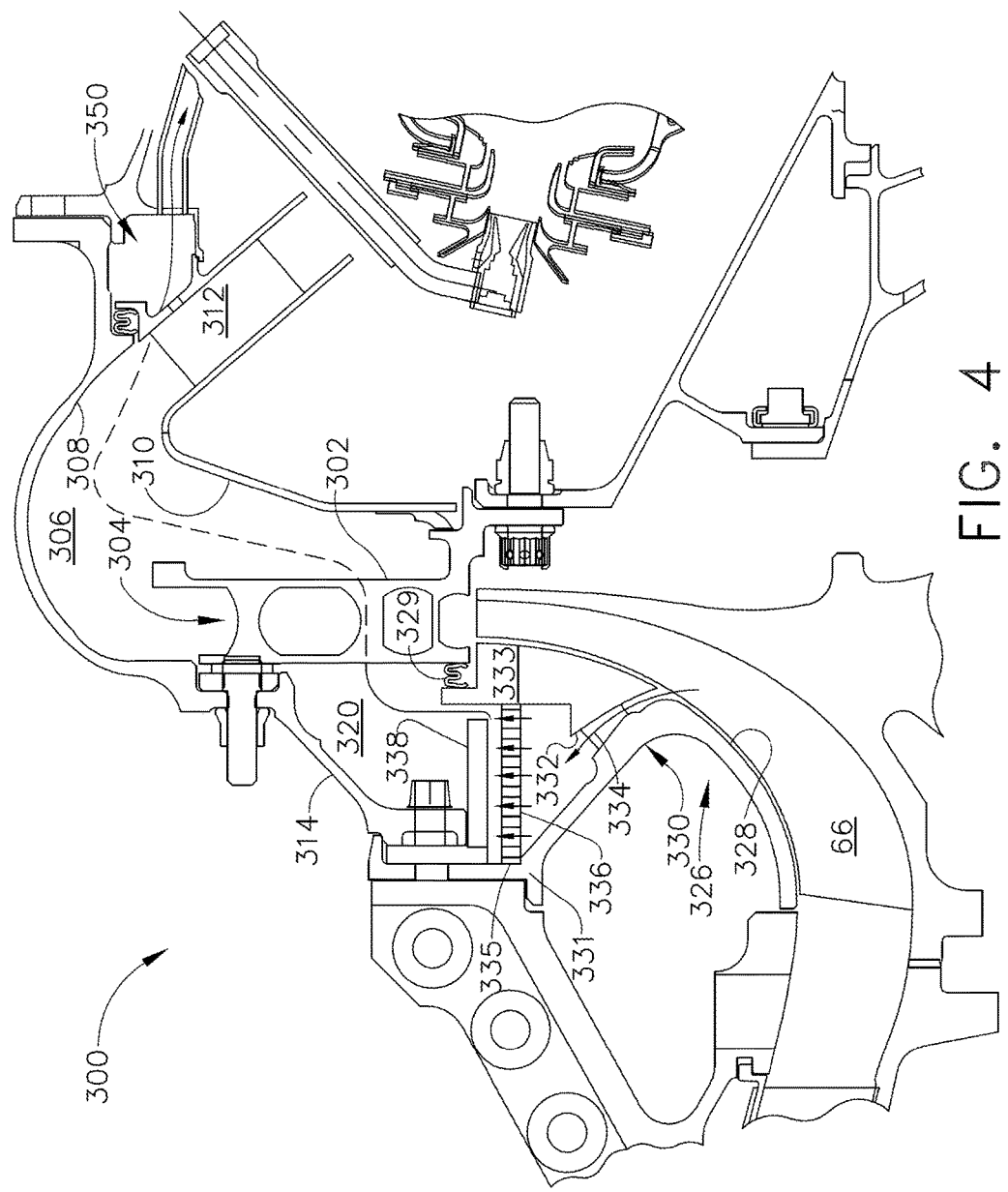
FIG. 4 is a schematic, sectional view of a portion of the engine of FIG. 1, incorporating a dirt extraction apparatus according to another alternative exemplary embodiment of the invention.

FIG. 4 depicts another alternative configuration of a dirt extraction apparatus 300 which may be incorporated into the compressor 10 described above. The dirt extraction apparatus 300 is generally similar to the dirt extraction apparatus 100 described above. Structures not specifically described may be considered to be identical to corresponding structures of the dirt extraction apparatus 100.

A stationary diffuser housing 302 is positioned radially adjacent the exit openings of impeller blades 66 and includes a plurality of diffuser passageways 304. Downstream of the diffuser passageways 304, an outlet flow passageway 306 with curved inner and outer walls 310, 308 has a plurality of turning vanes 312 therein. An annular outboard plenum wall 314 extends radially inward and axially forward from the outer wall 308 of the outlet flow passageway 306.

An annular shroud assembly 326 surrounds the impeller 38. The shroud assembly 326 defines a generally convex-curved outer flowpath surface 328 that closely surrounds the tips of the impeller blades 66. An outboard end of the shroud assembly 326 incorporates an annular seal 329 (for example a W-seal) to reduce air leakage between the shroud assembly 326 and the diffuser housing 302. An outboard portion of the shroud assembly 326 is split into forward and aft segments 331, 333, which are spaced-apart from each other and form roughly a V-shape when viewed in half-section. The forward segment 331 joins the outboard plenum wall 314, and collectively the forward and aft segments 331, 333, and the outboard plenum wall 314 define a plenum 320.

An extraction scoop 330 is disposed just outboard and axially forward of the impeller blades 66. In the illustrated example the extraction scoop 330 comprises an annular slot or passage 332 aligned at an acute angle to the longitudinal axis A. The passage 332 may be formed as an integral part of the shroud assembly 326. More specifically, the passage 326 is defined between the forward and aft segments 331 and 333, and increases in flow area in the direction of flow (i.e. it may have a diffuser shape). It may include an annular array of vanes 334 which are configured to increase in area and turn flow from a tangential direction to an axial direction, serving both diffusing and deswirling functions. The extraction scoop 330 communicates with the plenum 320.

A generally axially-oriented annular baffle 335, pierced with impingement holes 336, extends across the forward and aft segments 331, 333 of the shroud assembly 326. A dirt collector 338 of the type described above, is disposed in the plenum 320 just outboard of the baffle 335. Operation of the apparatus 300 is substantially as described above, with a difference being the air exiting the dirt collector 338 flows into passageway 350 by means of a series of tubes or passages 307 which bypass cavity 306 The tubes or passages 307 are depicted as dashed lines in FIG. 4 and do not communicate with the outlet flow passageway 306.

Figure 5:
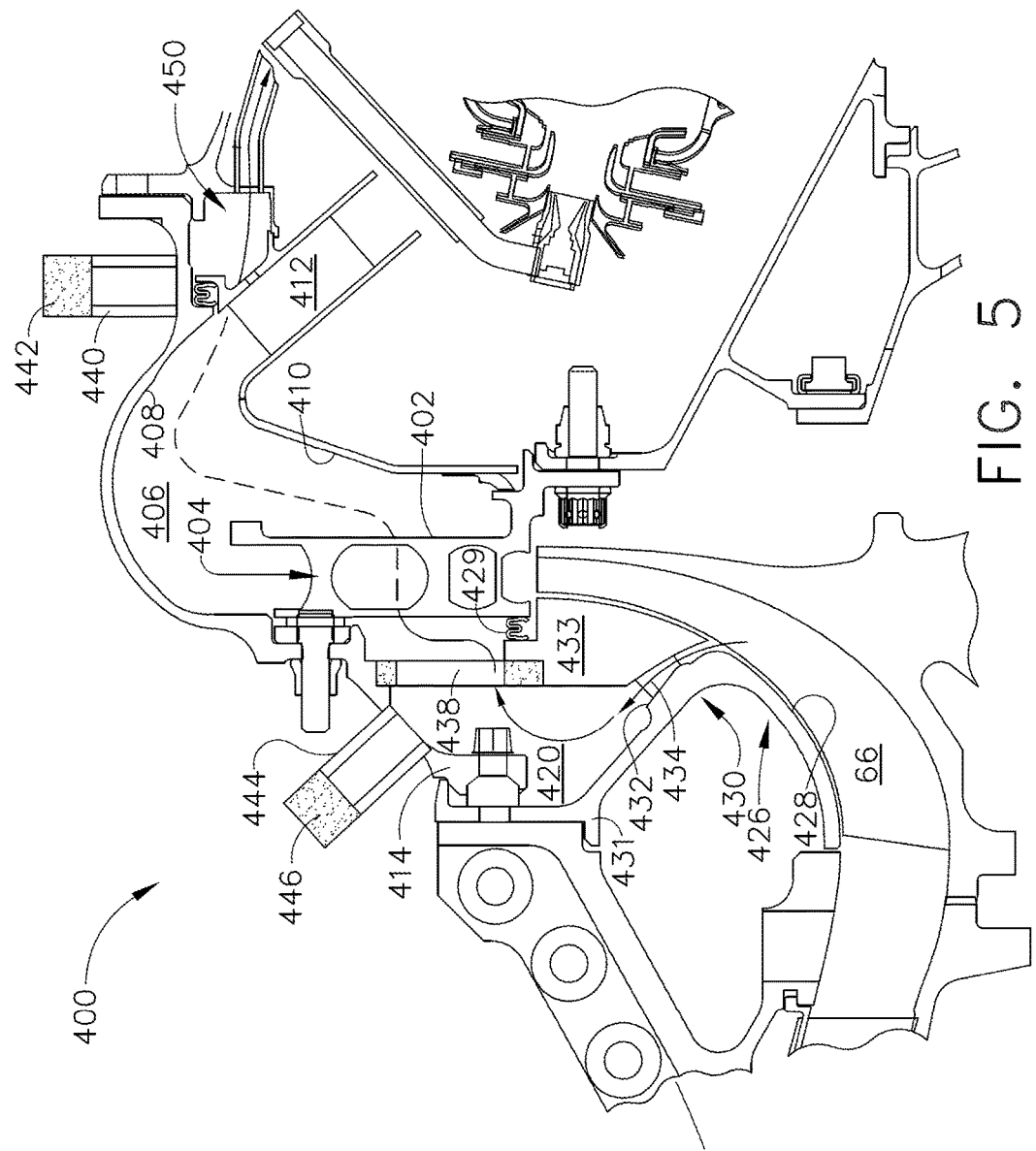
FIG. 5 is a schematic, sectional view of a portion of the engine of FIG. 1, incorporating a dirt extraction apparatus according to another alternative exemplary embodiment of the invention.

FIG. 5 depicts another alternative configuration of a dirt extraction apparatus 400 which may be incorporated into the compressor 10 described above. The dirt extraction apparatus 400 is generally similar to the third embodiment extraction apparatus 400 described above. Structures not specifically described may be considered to be identical to corresponding structures of the dirt extraction apparatus 300.

A stationary diffuser housing 402 is positioned radially adjacent the exit openings of impeller blades 66 and includes a plurality of diffuser passageways 404. Downstream of the diffuser passageways 404, an outlet flow passageway 406 with curved inner and outer walls 410, 408 has a plurality of turning vanes 412 therein. An annular outboard plenum wall 414 extends radially inward and axially forward from the outer wall 408 of the outlet flow passageway 406.

An annular shroud assembly 426 surrounds the impeller 38. The shroud assembly 426 a generally convex-curved outer flowpath surface 428 that closely surrounds the tips of the impeller blades 66. An outboard end of the shroud assembly 426 incorporates an annular seal 429 (for example a W-seal) to reduce air leakage between the shroud assembly 426 and the diffuser housing 402. An outboard portion of the shroud assembly 426 is split into forward and aft segments 431, 433, which are spaced-apart from each other and form roughly a V-shape when viewed in half-section. The forward segment 431 joins the outboard plenum wall 414, and collectively the forward and aft segments 431, 433, and the outboard plenum wall 414 define a plenum 420.

An extraction scoop 430 is disposed just outboard and axially forward of the impeller blades 66. In the illustrated example the extraction scoop 430 comprises an annular slot or passage 432 aligned at an acute angle to the longitudinal axis A. The passage 432 may be formed as an integral part of the shroud assembly 426. More specifically, the passage 432 is defined between the forward and aft segments 432 and 433, and increases in flow area in the direction of flow (i.e. it may have a diffuser shape). It may include an annular array of vanes 434 which are configured to increase in area and turn flow from a tangential direction to an axial direction, serving both diffusing and deswirling functions. The extraction scoop 430 communicates with the plenum 420.

A generally radially-oriented dirt collector 438 of the type described above, extends across the plenum 420 just forward of the diffuser housing 402. Operation of the apparatus 400 is substantially as described above for the apparatus 300. Air exiting the dirt collector 438 flows into passageway 450 by means of a series of tubes or passages 407 which bypass cavity 406. The tubes or passages 407 are depicted as dashed lines in FIG. 5 and do not communicate with the outlet flow passageway 406. One difference is that the dirt collector 438 does not include a bypass flowpath, so it functions as a filter and must be kept clear to function properly.

The apparatus 400 may include provisions for cleaning the dirt collector 438 when it becomes plugged or loaded with dirt. In the illustrated example an inlet media wash port 440 is provided communicating with the outlet passageway outer wall into passageway 450, closed off with a cap 442 or alternatively a quick-connect fitting. An outlet media wash port 444 is also provided, communicating with the plenum 420 upstream of the dirt collector 438, and closed off with a cap 446 or alternatively a quick-connect fitting. To clean the dirt collector 438, supply line of pressurized water our other suitable cleaning fluid would be connected to the inlet media wash port 440 and a drain line connected to the outlet media wash port 444. The flow of water or other cleaning media is effective to dislodge dirt from the dirt collector 438 and flush it through the outlet media wash port 444. To help encourage flow, the inlet media wash port 440 can be positioned at a high point on the engine 12 (e.g. 12 o'clock), and the outlet media wash port 444 can be placed at a low point on the engine 12 (e.g. 6 o'clock).

The dirt extraction apparatus described herein has several advantages over the prior art. The extraction scoop takes advantage of the high dirt concentration on the impeller shroud region. Placing the scoop strategically on the outer liner of the shroud will remove a substantial portion of the dirt in the air, resulting in cleaner air for the turbine. At the area of the scoop deswirling vanes are designed to maximize the dynamic head recovery. This provides an advantage for turbine cooling as higher pressure allows the use of this air for purging the rotor and the higher pressure shrouds and nozzles. The remaining air exiting the plenum is substantially cleaner, avoiding dirt collection in turbine components which result in reduced life. This will result in a reduction in primary distress modes such as CMAS, erosion, plugging and cooling degradation. As a result the turbine will have a substantial improvement in durability and performance retention.

The foregoing has described a dirt extraction apparatus for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A centrifugal compressor apparatus, comprising:
an impeller mounted for rotation about a central longitudinal axis, the impeller including an impeller disk carrying an array of impeller blades around its periphery;
a diffuser disposed downstream of the impeller, configured to diffuse and turn airflow discharged from the impeller;
an extraction scoop disposed in fluid communication with the impeller and with a plenum disposed adjacent the impeller, and
a dirt collector disposed in fluid communication with the plenum and configured to trap dirt therein and wherein the dirt collector comprises a porous ceramic or metallic material.

2. The apparatus of claim 1 wherein the diffuser is disposed radially outboard of the impeller and includes a plurality of diffuser passageways.

3. The apparatus of claim 1 wherein a shroud assembly defining a convex-curved outer flowpath surface is positioned to closely surround the impeller blades.

4. The apparatus of claim 3 where in the extraction scoop is formed as a part of the diffuser and positioned radially outboard of the shroud.

5. The apparatus of claim 3 where in the extraction scoop is formed as a part of the shroud assembly.

6. The apparatus of claim 3 wherein an outer portion of the shroud assembly is divided into forward and aft segments defining a V-shape, and the extraction scoop is defined by the V-shape.

7. The apparatus of claim 6 wherein a baffle pierced with impingement holes spans the forward and aft segments.

8. The apparatus of claim 1 wherein the extraction scoop has a diffuser shape.

9. The apparatus of claim 1 wherein an annular array of vanes are disposed in the extraction scoop.

10. The apparatus of claim 1 wherein a bypass duct separate from the diffuser communicates with the dirt collector.

11. The apparatus of claim 1 wherein the plenum is defined in part by an outboard plenum wall having an impingement hole formed therein, the impingement hole positioned to direct air flow to the dirt collector.

12. The apparatus of claim 1 further including at least one media wash port disposed in communication with the dirt collector.

13. The apparatus of claim 12 comprising:
an inlet media wash port disposed downstream of the dirt collector; and
an outlet media wash port disposed upstream of the dirt collector.

14. A centrifugal compressor apparatus, comprising:
an impeller mounted for rotation about a central longitudinal axis, the impeller including an impeller disk carrying an array of impeller blades around its periphery;

a diffuser disposed downstream of the impeller, configured to diffuse and turn airflow discharged from the impeller;

an extraction scoop disposed in fluid communication with the impeller and with a plenum disposed adjacent the impeller, wherein an annular array of vanes are disposed in the extraction scoop, and a dirt collector disposed in fluid communication with the plenum and configured to trap dirt therein.

15. The apparatus of claim 14 further including at least one media wash port disposed in communication with the dirt collector.

16. A centrifugal compressor apparatus, comprising:

an impeller mounted for rotation about a central longitudinal axis, the impeller including an impeller disk carrying an array of impeller blades around its periphery;

a diffuser disposed downstream of the impeller, configured to diffuse and turn airflow discharged from the impeller;

an extraction scoop disposed in fluid communication with the impeller and with a plenum disposed adjacent the impeller, wherein the plenum is defined in part by an outboard plenum wall having an impingement hole formed therein, the impingement hole positioned to direct air flow to the dirt collector, and a dirt collector disposed in fluid communication with the plenum and configured to trap dirt therein.

17. The apparatus of claim 16 further including at least one media wash port disposed in communication with the dirt collector.

* * * * *